United States Patent
Thrush et al.

(10) Patent No.: US 12,115,895 B2
(45) Date of Patent: Oct. 15, 2024

(54) METHODS AND APPARATUS FOR RELEASABLY SECURING A ROBOT IN A DELIVERY VEHICLE

(71) Applicant: Agility Robotics, Inc., Tangent, PA (US)

(72) Inventors: Dylan Thrush, Albany, OR (US);
Jonathan Hurst, Albany, OR (US);
Mitchell Bernards, Albany, OR (US);
Damion Shelton, Allison Park, PA (US); Andrew Abate, Albany, OR (US)

(73) Assignee: Agility Robotics, Inc., Salem, OR (US)

( * ) Notice: Subject to any disclaimer, the term of this patent is extended or adjusted under 35 U.S.C. 154(b) by 0 days.

(21) Appl. No.: 17/609,728

(22) PCT Filed: May 8, 2020

(86) PCT No.: PCT/US2020/032252
§ 371 (c)(1),
(2) Date: Nov. 8, 2021

(87) PCT Pub. No.: WO2020/227695
PCT Pub. Date: Nov. 12, 2020

(65) Prior Publication Data
US 2022/0227279 A1    Jul. 21, 2022

Related U.S. Application Data

(60) Provisional application No. 62/845,220, filed on May 8, 2019.

(51) Int. Cl.
*B60P 1/00* (2006.01)
*B60P 3/00* (2006.01)
*B60P 1/48* (2006.01)

(52) U.S. Cl.
CPC .............. *B60P 1/003* (2013.01); *B60P 3/007* (2013.01); *B60P 1/48* (2013.01)

(58) Field of Classification Search
CPC .......... B60P 1/003; B60P 3/007; B60L 53/16; B60L 53/30; B60L 53/32; B60L 53/35
(Continued)

(56) References Cited

U.S. PATENT DOCUMENTS

| | | | |
|---|---|---|---|
| 3,913,759 A | 10/1975 | Deacon | |
| 5,308,214 A | 5/1994 | Crain et al. | |

(Continued)

FOREIGN PATENT DOCUMENTS

| | | |
|---|---|---|
| CN | 105128031 A | 12/2015 |
| DE | 102008045471 A1 | 3/2010 |

(Continued)

OTHER PUBLICATIONS

International Search Report in PCT/US2020/032252, mailed Jul. 28, 2020.
(Continued)

*Primary Examiner* — James Keenan

(57) ABSTRACT

A deployment assembly is mounted in a delivery vehicle and holds an autonomous robot that can be deployed to deliver or pick up packages. The assembly has a base and extendable members that move the robot from a retracted position inside the vehicle and an extended position outside the vehicle. The assembly also has securement features that hold the robot in during transport and can also recharge the robot if necessary.

19 Claims, 9 Drawing Sheets

(58) Field of Classification Search
USPC .......................................... 320/109; 414/522
See application file for complete search history.

(56) References Cited

U.S. PATENT DOCUMENTS

| | | | | | |
|---|---|---|---|---|---|
| 5,570,988 | A | * | 11/1996 | Gallaway | B60P 1/003 414/498 |
| 5,714,864 | A | * | 2/1998 | Rose | B60L 53/16 320/109 |
| 6,918,734 | B2 | * | 7/2005 | Nick | B60P 1/003 414/629 |
| 8,796,990 | B2 | * | 8/2014 | Paparo | B60L 53/38 320/108 |
| 10,512,571 | B2 | * | 12/2019 | Carletti | A61G 1/06 |
| 10,780,814 | B2 | * | 9/2020 | Hempsch | A47G 29/1209 |
| 10,809,745 | B2 | * | 10/2020 | Ruth | B60P 3/06 |
| 10,908,612 | B2 | * | 2/2021 | Palan | B62D 57/022 |
| 10,948,914 | B2 | * | 3/2021 | Xiao | G06Q 10/0832 |
| 11,741,422 | B2 | * | 8/2023 | Gil | B60P 3/34 705/338 |
| 2014/0356112 | A1 | * | 12/2014 | Garcia | B60P 1/003 414/809 |
| 2015/0224836 | A1 | | 8/2015 | Stanifer et al. | |
| 2016/0200438 | A1 | | 7/2016 | Bokeno et al. | |
| 2019/0055018 | A1 | | 2/2019 | Bei et al. | |
| 2019/0070995 | A1 | * | 3/2019 | Cantrell | B60P 3/007 |
| 2019/0142659 | A1 | | 5/2019 | Celis et al. | |
| 2019/0259000 | A1 | * | 8/2019 | Buckhalt | G06Q 10/08 |
| 2019/0329691 | A1 | * | 10/2019 | Crawford | G05D 1/0291 |
| 2020/0174494 | A1 | * | 6/2020 | Lessels | G06Q 50/28 |
| 2020/0175471 | A1 | * | 6/2020 | Tsuruta | B64C 39/024 |

FOREIGN PATENT DOCUMENTS

| | | | | |
|---|---|---|---|---|
| DE | 102015010871 A1 | * | 2/2017 | ............. B60P 1/003 |
| DE | 102016010688 A1 | * | 3/2018 | ............. B60P 3/007 |
| DE | 102017220200 B3 | | 3/2019 | |
| FR | 3051411 A1 | * | 11/2017 | ............. B60P 3/007 |
| JP | 2011-093370 | | 5/2011 | |
| WO | WO-2004082993 A2 | * | 9/2004 | ............. B60P 1/003 |
| WO | 2019191383 A1 | | 3/2019 | |

OTHER PUBLICATIONS

Machine Translation of German Patent Application Publication No. 102008045471.

Machine translation of Japanese Patent Application 2009-247502 (correlating to JP 2011-093370).

* cited by examiner

METHODS AND APPARATUS FOR RELEASABLY SECURING A ROBOT IN A DELIVERY VEHICLE

This is an international application that claims the benefit of priority of U.S. Provisional Application No. 62/845,220, filed May 8, 2019, entitled "Method and Apparatus for Releasably Securing a Personal Package Delivery Device in a Delivery Vehicle", the entire contents of which are incorporated herein by reference.

BACKGROUND OF THE INVENTION

The present invention relates to autonomous vehicles and systems for use in the delivery of goods in commerce. While there has been much discussion about the use of autonomous vehicles for passenger use, the full promise of autonomous delivery vehicles is a story that is still being written. Self-driving semi trailer-trucks, for example, are currently traversing the highways in Arizona and a few other western states and delivering freight in bulk from one distribution center to another. At present, however, a human operator still rides along in the semi trailer-truck to add an extra layer of safety in unexpected traffic situations and that driver then takes control of the vehicle when the truck exits the highway near its destination due to the additional complexity of navigation on non-highway roadways.

While the added complexity of navigating non-highway roads is being explored by a number of well-publicized efforts, most of the publicized focus has been on self-driving vehicles for use in passenger transportation. Personal package delivery has typically been handled by package delivery companies using a human-driven vehicle. This is not only because autonomous travel on a community or city-wide level is not yet perfected, but also because there is presently no non-human way to autonomously deliver a package from a delivery vehicle at curb-side to the front door or other designated location at the delivery address. There are often front steps and other obstacles to be traversed between the curb and the front door. At present, a human driver is still required to locate the appropriate package to be delivered from within the delivery vehicle and carry it to the doorstep or other preferably sheltered location at the delivery destination. Several companies are working towards autonomous grocery deliveries, which require the recipient to meet the vehicle; but the vast majority of deliveries are unattended deliveries, and require some way to get from the vehicle to the doorstep or other final destination.

Given these real-world challenges to autonomously delivering personal packages from a delivery vehicle to the doorstep of the delivery location, several options have emerged: aerial delivery via drone or other UAV, ground delivery via autonomous wheeled container, and ground delivery via ambulatory autonomous robot. In areas where drones and small wheeled vehicles are impractical due to stairs or other obstacles, ambulatory robots can be used, but what is needed to increase reliability and predictability of the overall system is a mounting system that can safely store and optionally charge the robots when the delivery vehicle is in transit and effectively deploy them when the vehicle has arrived at a destination for the curbside to doorstep portion of the delivery.

SUMMARY OF THE INVENTION

The present invention comprises a deployment assembly for releasably securing a mobile robot in a delivery vehicle. The assembly comprises a base portion removably mounted to the vehicle and one or more extendable members coupled to the base portion and having at least one securement feature operative to releasably secure the robot. The extendable members are operative to move between a retracted position and an extended position whereby the mobile robot is deployed from the vehicle or, in the case of a returning robot, prepared to be stowed in the vehicle. The extendable members may be actuated by the robot or they may be self-actuated. In embodiments, the docking assembly charges the mobile robot and exchanges data, although data exchange may be performed wirelessly as well.

In an embodiment, sensors and communication links are disposed on the assembly for communicating with the robot or the vehicle. Communications with the robot may entail determining if it is time to extend or retract the extendable members. Communications with the vehicle include the opening or closing of the access door to deploy or receive the robot. Communication may occur through wireless or wired methods.

In another embodiment, the deployment assembly is encased in an enclosure to both secure the robot when it is stowed and to hide it from view of passersby. The base portion of the deployment assembly may further include an additional securement feature to further secure the robot.

The present invention also provides a method for deploying an autonomous robot from a vehicle, such as a delivery vehicle, where the robot is secured in the vehicle by a deployment assembly have a base portion and one or more extendable members. The extendable members are extended with the robot attached to them via a securement feature and once the members are fully extended, the deployment assembly sends a signal to the robot, which allows the robot to proceed with a delivery. As the robot proceeds with a package, for example, the extendable members are retracted and the access door to the vehicle is closed. When the robot has completed its pickup or delivery, the process repeats in reverse with the end result being the robot back inside the vehicle in a stowed position.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

While implementations of the disclosed inventions are described herein by way of example, those skilled in the art will recognize that they are not limited to the embodiments or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are not meant to be used to limit the scope of the description or the claims.

DETAILED DESCRIPTION OF THE INVENTION

In the following description, for purposes of explanation, numerous specific details are set forth in order to provide a thorough understanding of example embodiments. It will be evident to one skilled in the art, however, that embodiments can be practiced without these specific details. In some instances, well-known methods or components have not been described in detail so that the details of the present invention are not obfuscated.

In the interest of clarity, some routine features of the implementations described herein are omitted. It will be appreciated that in the development of any actual implementation of the present invention, certain decisions must be made in order to achieve specific goals, and that different decisions may be made to achieve different goals without departing from the teachings of the invention. While certain implementations might be complex and time-consuming, they would nevertheless be routine to accomplish for those of ordinary skill in the art having the benefit of this disclosure.

As discussed herein, the overall process for autonomously delivering packages from a distribution depot to their ultimate destination starts with packages being loaded onto a delivery van. In certain embodiments, this is performed by workers at the distribution center, but in other embodiments, autonomous robots are used to identify packages and place them in the appropriate vehicles. In some embodiments, a robot may then board the delivery vehicle and ride to the first stop where it will deploy from the vehicle and carry the appropriate package to an identified location on the premises of the destination address. It will then return to the delivery vehicle and re-board it in preparation for the ride to the next delivery stop. It is the boarding and unboarding (also referred to as deployment herein) process and mechanics that is the subject and focus of the present application.

Figure 1A:
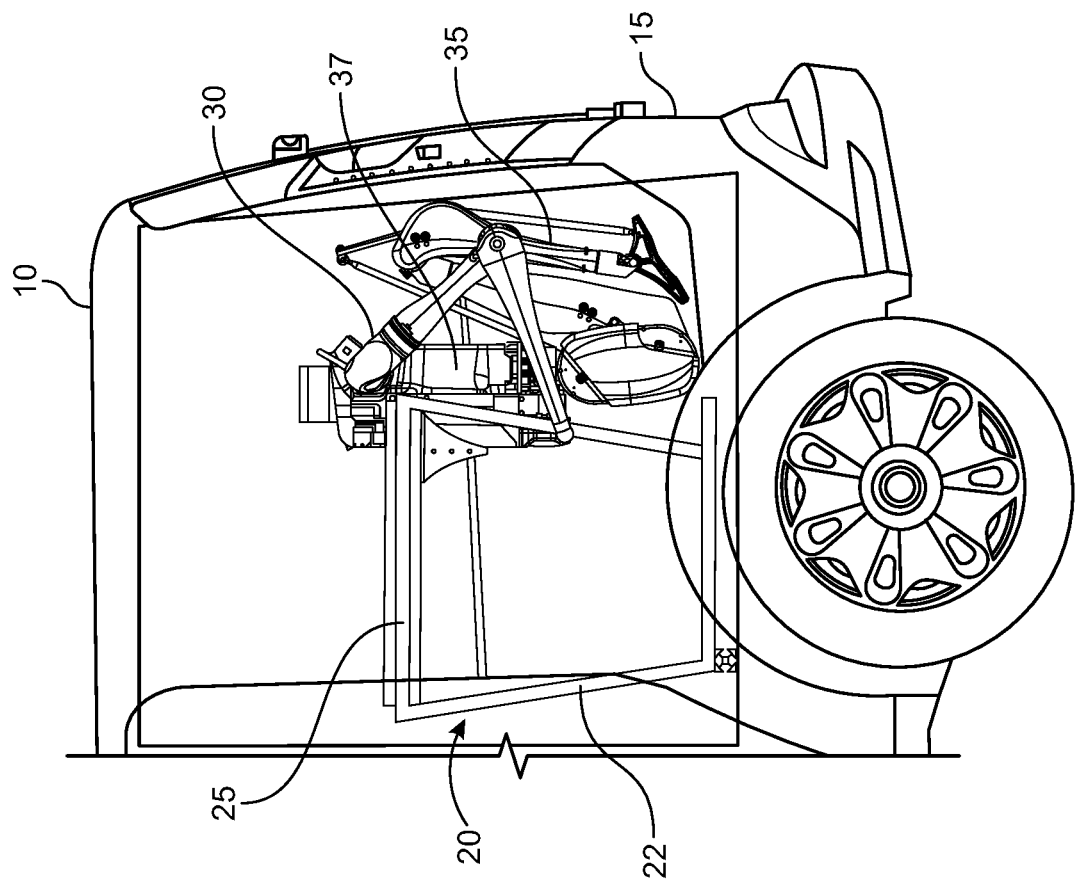
FIGS. 1a and 1b are partially transparent illustrations of a deployment assembly installed in the rear of a delivery vehicle.
Figure 1B:
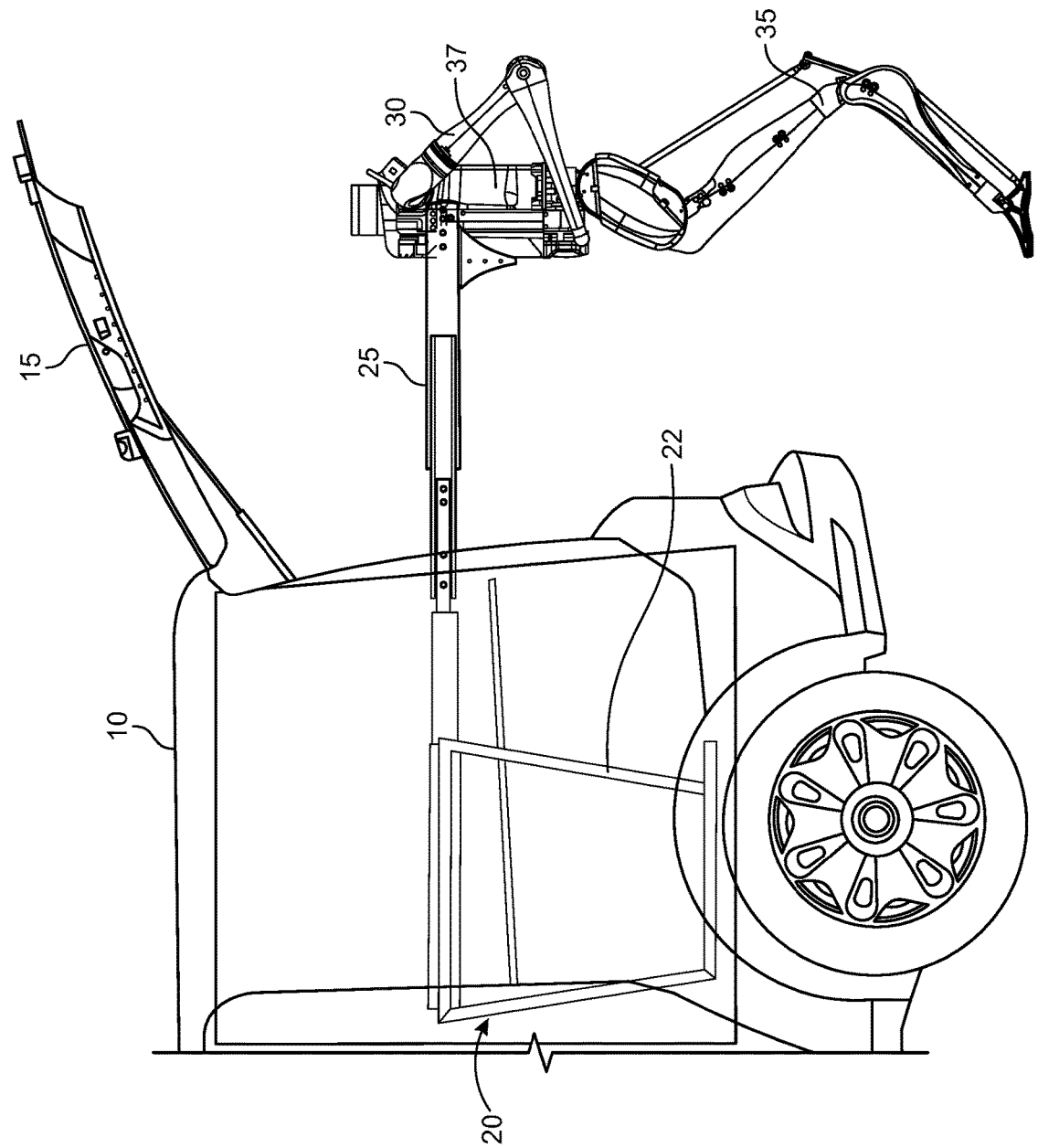

FIGS. 1a and 1b show a partially transparent side view of a rear portion of a delivery vehicle 10 with an embodiment of a robot deployment assembly 20 consistent with the teachings of the presently disclosed invention installed. With reference to FIG. 1a, the deployment assembly 20 is in a fully retracted position with a robot 30 folded into a docked configuration and attached to, or otherwise disposed upon, the assembly 20 such that the robot 30 fits inside the vehicle 10 with the liftgate 15 closed. While the robot 30 in this embodiment is configured to fold its legs 35 behind its torso 37 to fit inside the vehicle 10, other robots may be configured differently and may fit in the vehicle in different ways, which may require slight changes to the configuration of the assembly 20, but which will not deviate from the inventive aspects disclosed.

Figure 2:
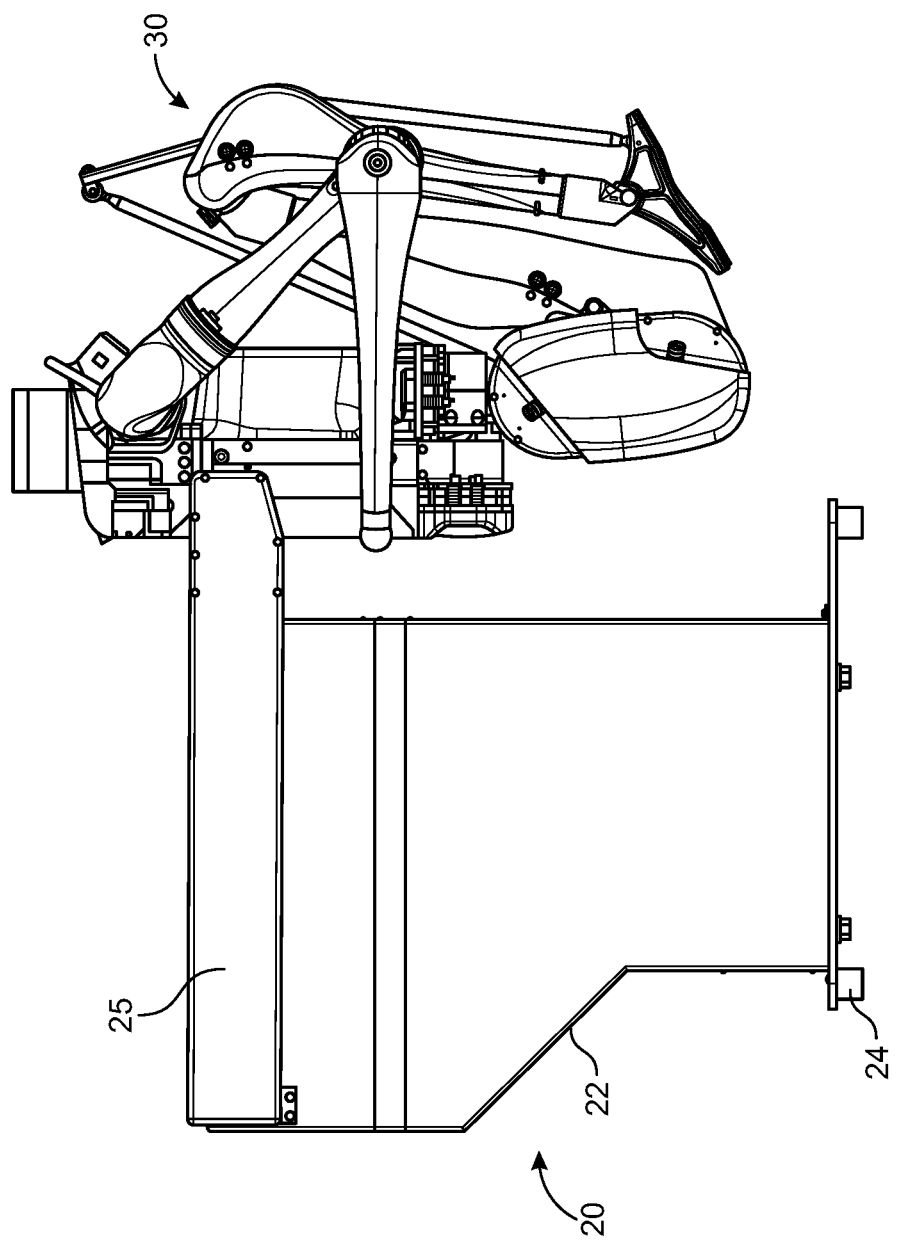
FIG. 2 is an elevational side view of a deployment assembly in retracted position with a robot in a folded configuration on the assembly's extendable members.
Figure 3:
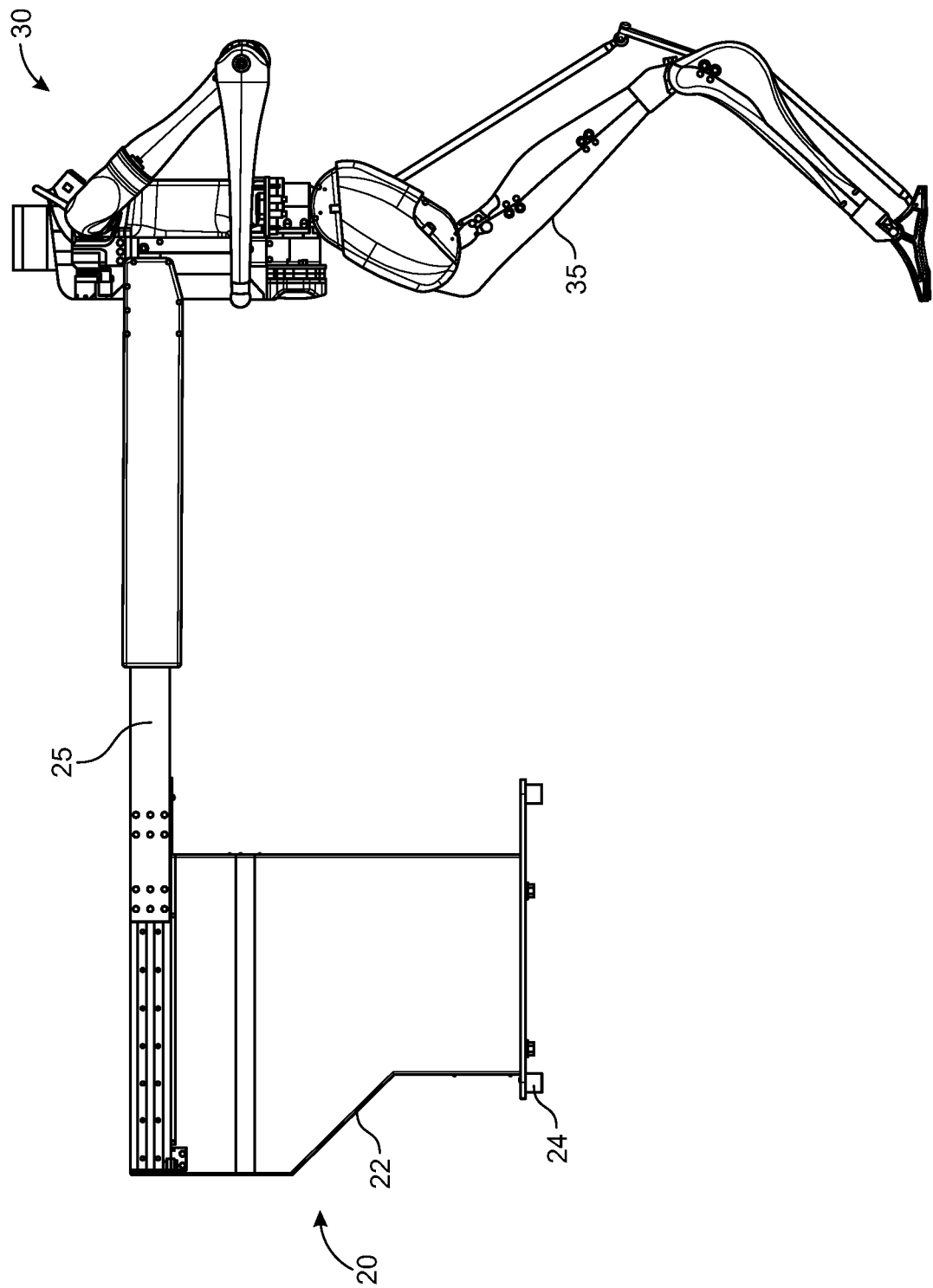
FIG. 3 is an elevational side view of a deployment assembly in an extended position with a robot in an operational configuration on the assembly's extendable members.

FIGS. 2 and 3 are an isolated depiction of an embodiment of a robot deployment assembly 20 having a base portion 22 and extendable members 25. FIG. 2 shows the assembly 20 fully retracted with the robot 30 folded into a docked configuration and disposed on the assembly 20. FIG. 3 shows the assembly 20 fully extended with the robot's legs 35 extended in an operational configuration. In certain embodiments, the assembly 20 is secured to the floor of a vehicle, such as vehicle 10, adjacent to the rear doors or lift gate with bolts 24 or other suitable fasteners. In other embodiments, the assembly is secured to the floor of the vehicle using the rear bench seat anchor points, with a latch for easy installation and removal; however, other attachment methods will be readily apparent to those of skill in the art and may vary depending on the type of vehicle used. In further embodiments, the assembly 20 is removable from the vehicle.

In embodiments, the robot 30 is removably connected to the assembly 20 so that when the vehicle 10 travels from one delivery destination to the next, the robot 30 is not damaged and passengers are protected from the robot accidentally shifting in transit or in case of a car accident. In certain embodiments, the assembly 20 has extendable members 25 that support the robot 30 at one or more points. One support point may be in an area analogous to the armpits of the robot 30 and the combination of the weight of the robot 30 and some feature of the extendable members 25 keeps the robot 30 in place when it is in a docked configuration. In certain embodiments, the feature is a groove or a divot in which the robot rests. In other embodiments, such as is illustrated in FIGS. 4, 5a, and 5b, the extendable members 25 contain securement features 40 to help secure the robot 30 on the members 25.

Figure 4:
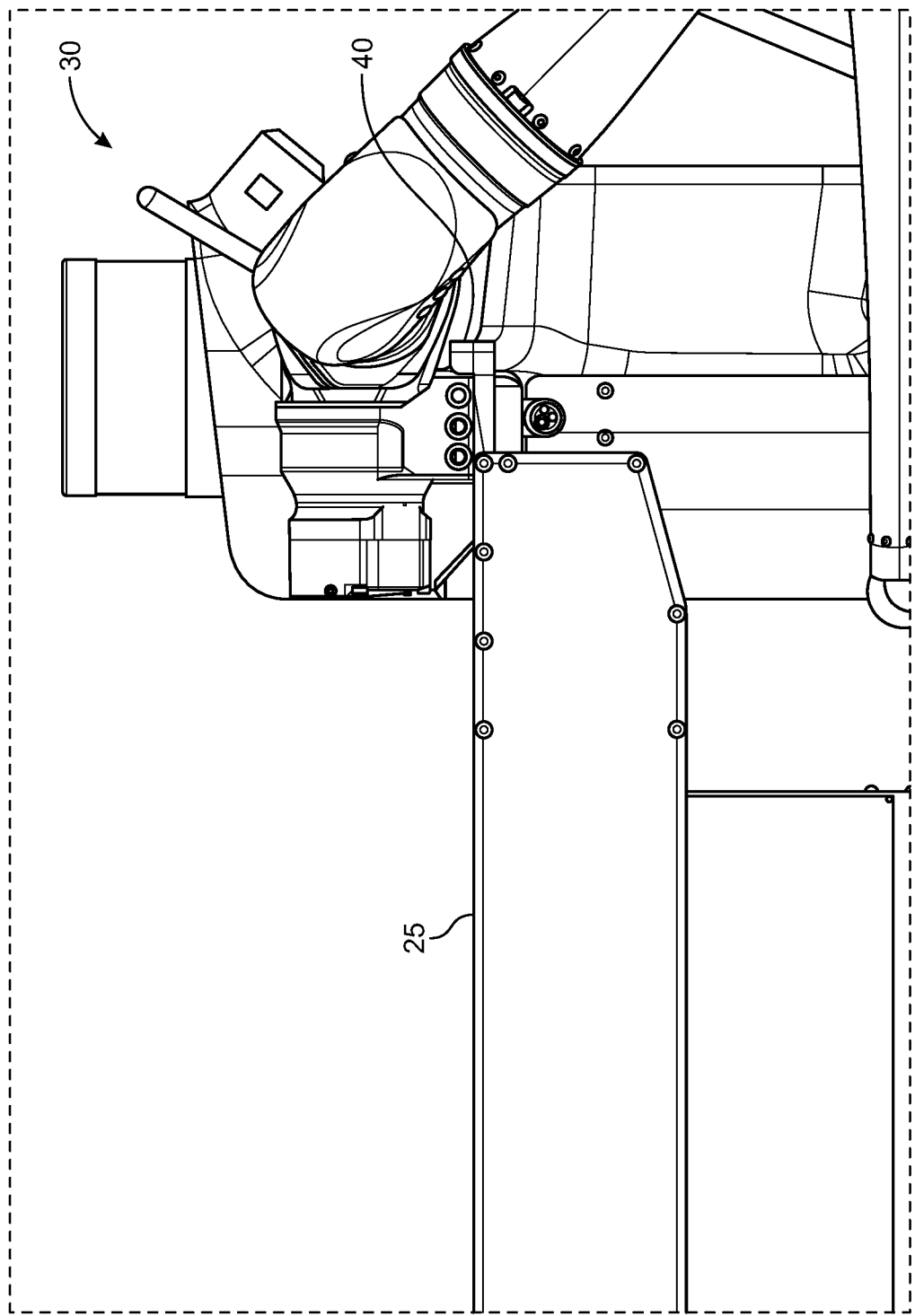
FIG. 4 is a close-up side illustration of an embodiment of a portion of the extendable members having a robot disposed thereon.
Figure 5A:
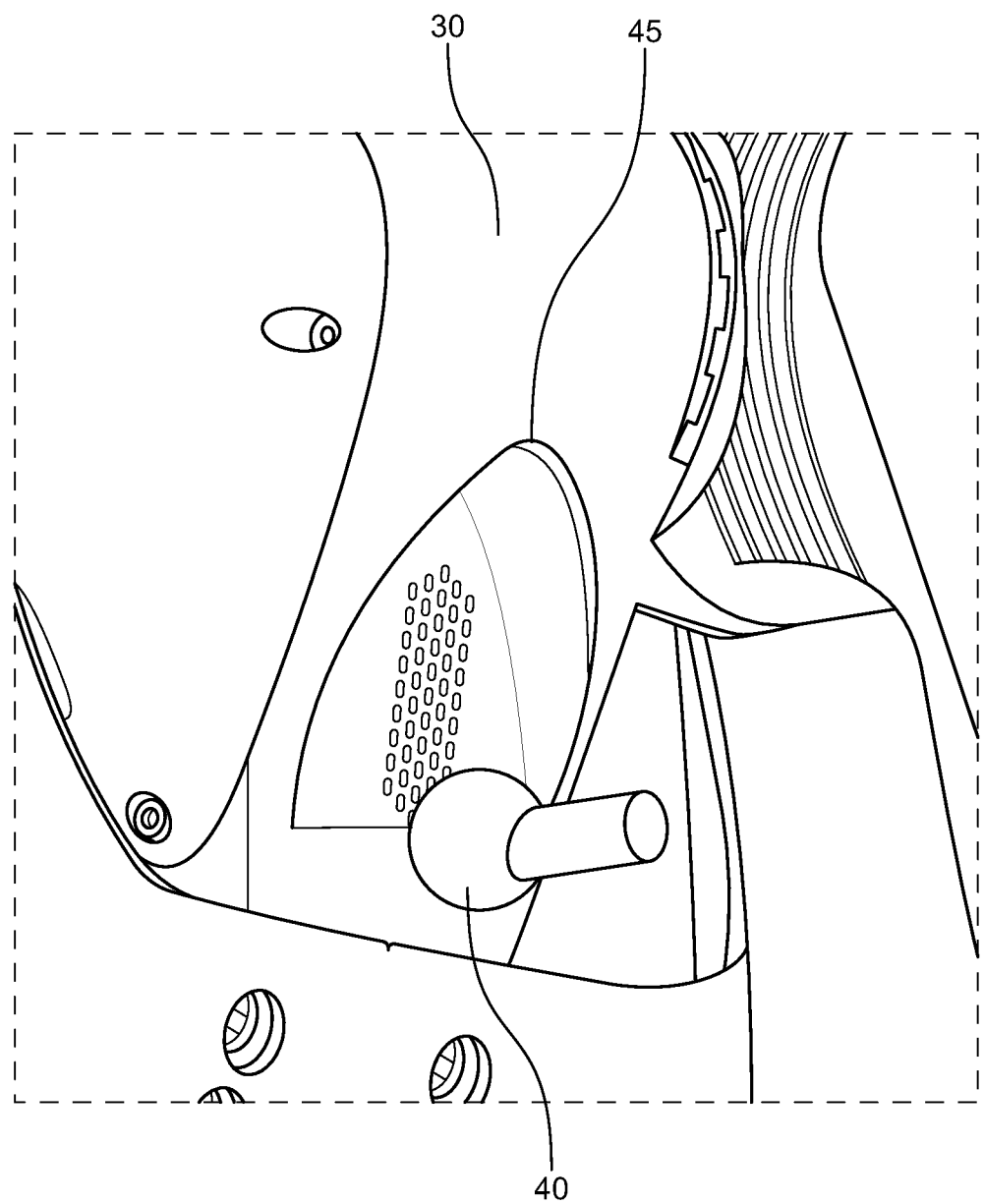
FIGS. 5a and 5b are close up side illustrations of another embodiment of a portion of the extendable members having a protrusion shaped to fit into a recessed portion of a robot.
Figure 5B:
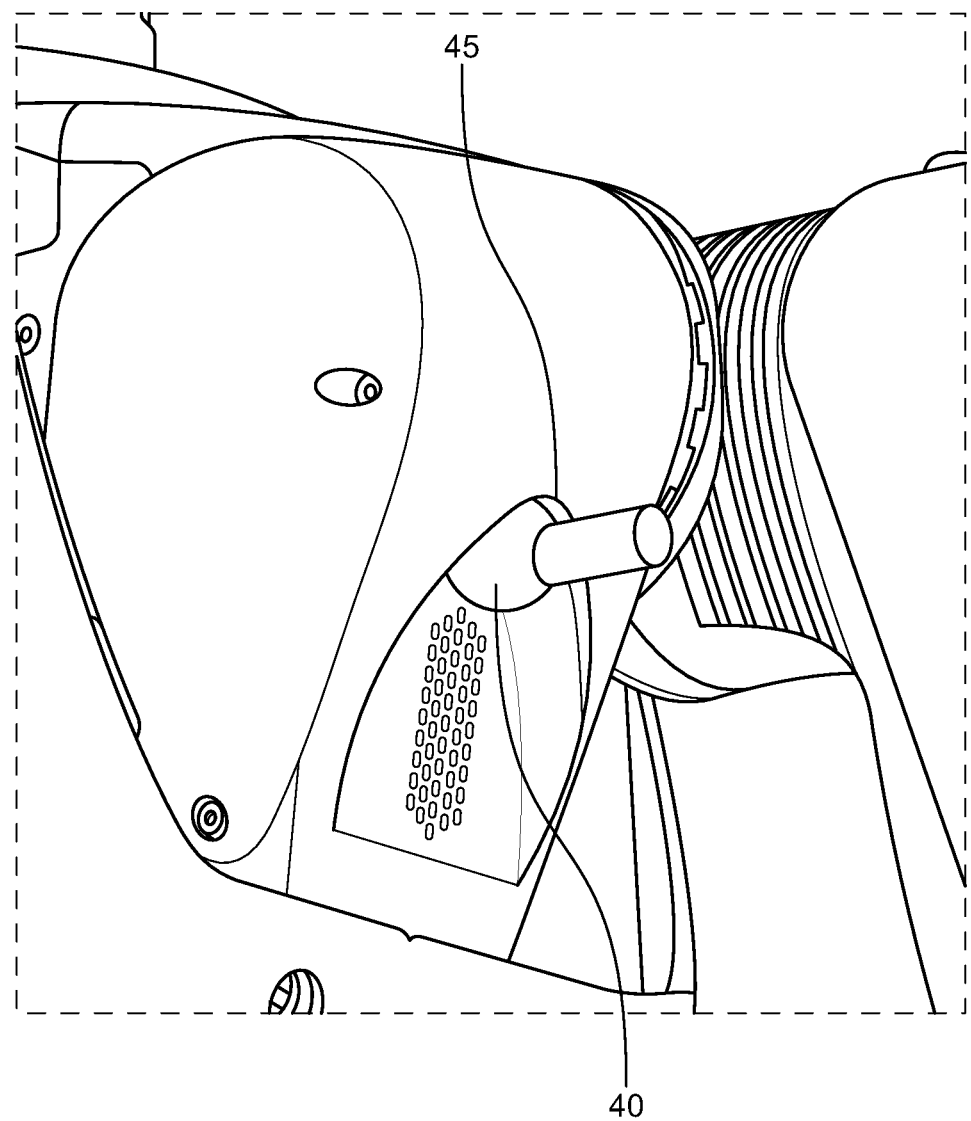

In an embodiment, robot 30 in FIG. 4 is illustrated resting on the extendable members 25, with a securement feature 40 that keeps the robot 30 from becoming dislodged from the members 25. The securement feature 40 can be one or a plurality of protrusions, indentations, magnets, electromagnets, straps such as may encircle the arms or torso of the robot, hooks, or an attachment point or other means of physically securing the robot inside the vehicle such that the robot is able to be connected or to automatically connect itself securely for transport. In other embodiments, such as illustrated in FIGS. 5a and 5b, securement feature 40 on the extendable member (not shown for purposes of clarity) cooperates with a recess 45 on the robot 30 to secure the robot to the extendable member 25 during transport. Further embodiments include an actuated latching mechanism that automatically secures the robot 30 once an appropriate signal has been sent from the robot 30 or the vehicle 10 to the assembly 20. For stability in transport, some embodiments may have a second point of contact between the robot 30 and the assembly 20 or the extendable members 25, such as in an area analogous to the chest or pelvis of the robot 30.

Referring, once again, to FIG. 1b, when deployment of the robot 30 is desired, the lift gate 15 is raised and the extendable members 25 extend in order to position the robot 30 fully outside the rear of the vehicle 10. In certain embodiments, the robot 30 then extends its legs 35 to the ground and disengages itself from the extendable members 25 by pushing its legs 35 against the ground to raise its torso 37 off the members 25.

In certain other embodiments, the manner of extension of the extendable members 25 includes the employment of a mechanism like a drawer slide or other non-actuated telescoping mechanism that the robot employs by pushing itself away from the assembly 20 with its arms, for example. In alternative embodiments, such as is illustrated and discussed more fully in relation to FIGS. 6 and 7, the extendable members 25 are mechanically actuated.

In still other embodiments, the extendable members 25 are comprised of a linkage, such as a 4-bar linkage, that will deploy the robot 30 through an arc trajectory, lifting slightly from the resting place in the vehicle 10, and then bringing the robot 30 down towards the ground outside of the vehicle 10. In such an embodiment, the robot 30 would not need to be bipedal or have feet that can be extended. Instead, the robot could be wheeled or even quadrupedal, for example.

For the robot 30 to board the vehicle 10, essentially the reverse would occur: the robot 30 autonomously navigates to the rear of the vehicle and positions itself in a predetermined orientation and location relative to the rack, assuming the lift gate 15 is open. In embodiments where the extendable members 25 are actuated, the robot 30 then sends a wireless signal to the assembly to extend the extendable members 25 using one or more member actuators. In an alternative embodiment, the vehicle or assembly 20 can detect that the robot is in position and extend the extendable members 25 without any prompt from the robot 30. If the lift gate 15 is not already open, either the robot 30 or the assembly 20 sends a message to the vehicle 10 to open the liftgate 15. Then, the members 25 would extend in order to receive the robot 30. After the robot 30 either connects to the extendable members 25 or places itself in position, depending on the embodiment, it lifts its feet so the members 25 support the robot's weight, and either pulls itself into the vehicle 10 with its own arms and fastens a safety latch or triggers the extendable members 25 to retract in embodiments. In other embodiments, such as a 4-bar lifting mechanism, the deployment mechanism will lift the robot up and into the vehicle after it is engaged. In either case, the robot 30 is effectively stowed on the assembly 20 and either the assembly 20 or the robot 30 sends a signal or message to the vehicle 10 to close the liftgate 15. As disclosed herein, the docking of the robot 30 to the extendable members 25 occurs autonomously and without human intervention or assistance. In embodiments, the deployment assembly 20 and the robot 30 coordinate the best docking approach, which may be: walk to location; orient appropriately; settle into place and latch; lift legs once positive engagement is confirmed; retract inside of vehicle In certain embodiments, once stowed, the robot 30 is contained inside an enclosure that is constructed as part of the deployment assembly 20 so that, optionally, it cannot be seen from outside the vehicle 10. Another benefit of storing the robot 30 in an enclosure inside the vehicle 10 is to ensure it is secured in case of vehicle accident. Further, a portion of the enclosure may be mounted to the rear door of the vehicle, making contact with the robot, so that the vehicle door serves as the latching mechanism that secures the robot in place for transport.

In embodiments, the deployment assembly 20 may be configured with one or more electrical connections to enable charging of a battery in the robot 30 while it is docked to allow use of a lighter and less expensive battery. In certain embodiments, these electrical connections are metal plates on the deployment assembly 20 located where the assembly engages with the robot 30, which may be slightly spring-loaded to ensure electrical contact with metal contacts on the robot 30, with a positive electrical connection at one side and a negative electrical connection at the other, such that it may charge any time the robot 30 is in the deployment assembly 20. The electrical connection can also, in embodiments, comprise a data connection point for data exchange between an external data source and the robot. In other embodiments, the deployment mechanism may contain an inductive charging coil, which will transmit power to a corresponding induction coil in the robot where the surfaces will be in close proximity, such as the chest area of the robot and a surface of the deployment mechanism. The data connection, in this case, may be wireless.

Figure 6:
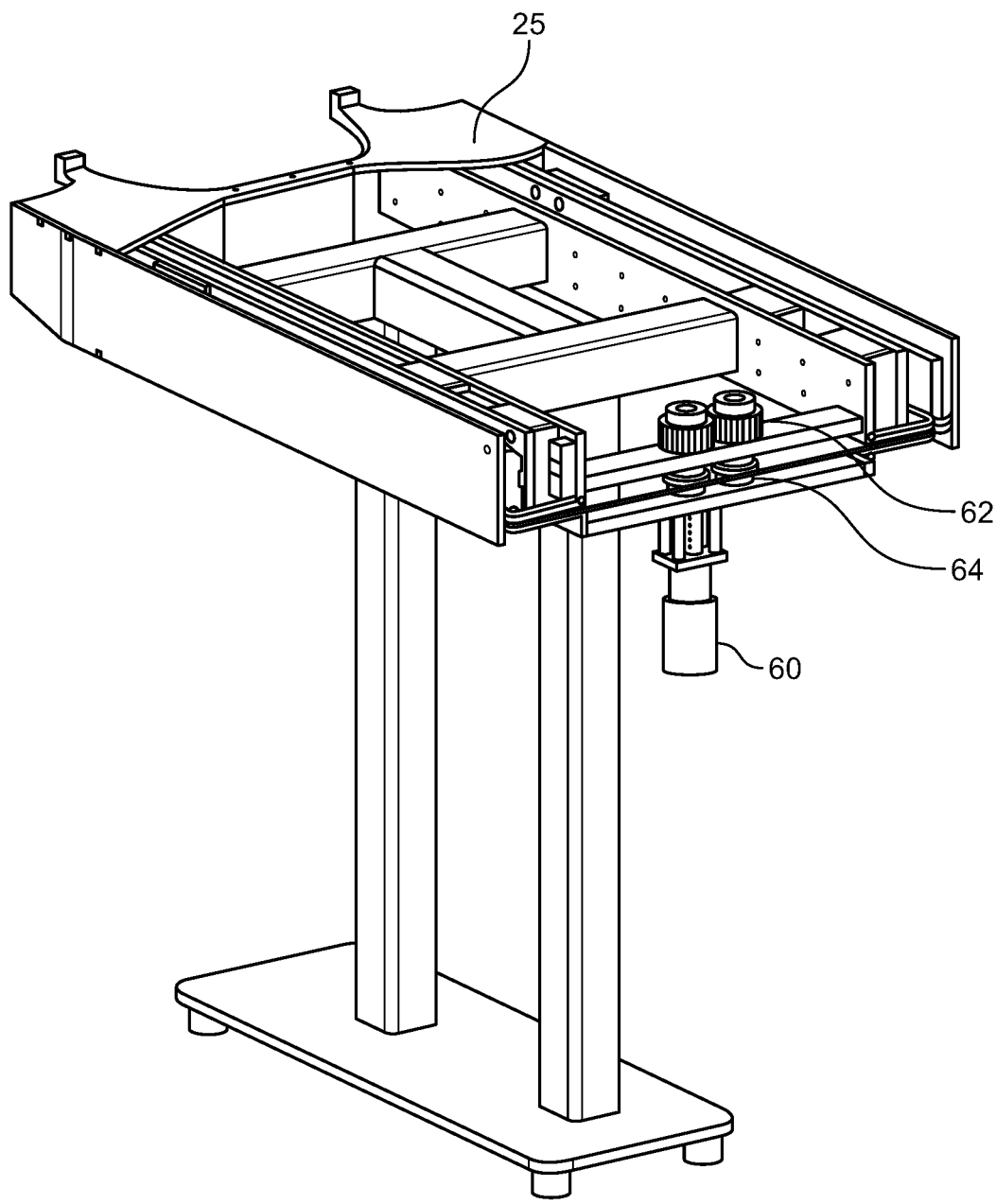
FIG. 6 is a perspective view of a self-actuating deployment assembly with a motor and cable drive system illustrated.
Figure 7:
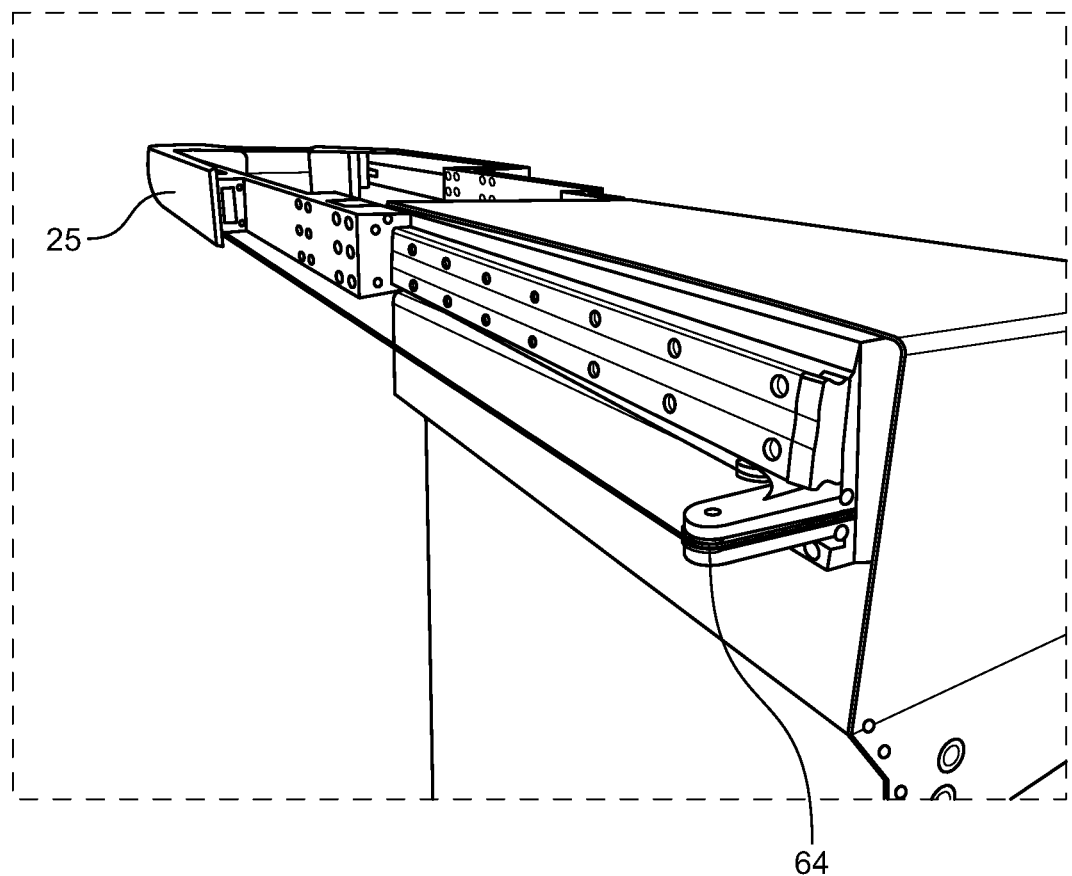
FIG. 7 is a perspective view of a deployment assembly constructed in accordance with the present invention and having a cable drive.

With reference to FIGS. 6 and 7, certain other embodiments of the assembly 20 employ extendable members 25 that can extend and retract without the robot 30. In these embodiments, a motor 60 drives a plurality of gears 62 that are connected to a cable pulley system 64 that actuates the extendable members 25. This would have the advantage of enabling the members 25 to self retract so the lift gate 15 can be shut when the robot 30 is delivering a package. While a cable pulley system is illustrated, those of skill in the art will recognize that there are other known drive mechanisms for extending and retracting the members 25.

In certain embodiments, then, the deployment assembly 20 communicates with the vehicle 10 to cause the lift gate 15 to open and close in appropriate circumstances. To accomplish this, the assembly 20 may have pressure sensors that identify the presence of the robot 30. In other embodiments, the assembly 20 may be in data communication with the vehicle to confirm when the vehicle has arrived at the delivery destination and has been placed in park in anticipation of the deployment process. This data communication may be either a physical connection to the robot or a wireless data connection using existing wireless communication technology such as bluetooth, wifi based on the IEEE 802.11 family of standards, cellular networks, or other radio communications. In embodiments, the robot deployment mechanism will have a computer onboard that controls its actuators and any latches or sensors, controls the charging of the robot, and interfaces to the vehicle power. It may also interface to a vehicle computing system if coordinating with the vehicle sensors, and contain the wireless communications to the robot.

One important role for a robot to be deployed from a vehicle will be delivering packages; and in certain embodiments, the packages may be piled or stacked in the rear of the vehicle, adjacent to the robot deployment assembly, and the robot may select and grasp a package as a human would in a similar situation. In other embodiments, a package deployment dispenser would contain the individual packages, with a known location for each package, and dispense each individual package to the robot. The dispenser may have a clearly known location for package pickup, may communicate wirelessly with the robot to indicate a package is ready to lift, and have convenient visual and physical features to allow the robot to identify the specific orientation and location of the package and to grasp and lift it reliably. In yet other embodiments, the package deployment mechanism places the package in the robot's grasp prior to robot deployment, such that the robot is already holding its package when deployed from the vehicle, and spends the minimal amount of time making a delivery.

Another important role for a robot to be deployed from a vehicle will be to do a job outside of the vehicle other than package delivery, such as neutralizing an improvised explosive device without exposing humans to the associated danger. The robot may deploy from an armored vehicle, or from an autonomous vehicle, walk to an already-identified suspicious device, and either place a disposal charge on the device or dismantle it manually, then walk back to the vehicle and be brought inside before activating the charge to dispose of the suspicious device.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

We claim:

1. A deployment assembly for releasably securing a bipedal robot having a pair of foldable legs, a pair of arms and a torso, to a vehicle, the assembly comprising:
   a base portion, mounted within the vehicle, wherein the base portion comprises a horizontal member coupled to the vehicle, and a vertical member;
   a pair of laterally extendable members coupled to the vertical member of the base portion, the pair of laterally extendable members having distal ends adapted to simultaneously engage the bipedal robot at its torso, the pair of laterally extendable members movable between a retracted position, wherein the distal ends are contained entirely within the vehicle and the bipedal robot is in a stowed location within the vehicle, and wherein the vertical member is configured to a height to allow the bipedal robot to be positioned in the stowed location, and an extended position, wherein the distal ends project a lateral distance out of the vehicle, wherein the pair of laterally extendable members are laterally extendable in a direction parallel to a ground surface on which the vehicle is positioned, and the bipedal robot is in a deployable location;
   one or more of a sensor and a communication link disposed on the assembly for communicating with one or more of the bipedal robot and the vehicle; and
   at least one securement feature disposed on each of the distal ends for engaging with, and releasably securing the bipedal robot.

2. The deployment assembly of claim 1, wherein the pair of laterally extendable members are comprised of one or more of drawer slides and laterally sliding linkages.

3. The assembly of claim 1, wherein the deployment assembly further comprises an enclosure into which the bipedal robot is stored when it is connected to the pair of laterally extendable members and is in a retracted position.

4. The assembly of claim 1, wherein the at least one securement feature comprises a physical feature that cooperates with a complementary feature on the torso of the bipedal robot to secure the bipedal robot to each of the pair of laterally extendable members.

5. The deployment assembly of claim 1, further comprising one or more electrical connections for charging the bipedal robot.

6. The deployment assembly of claim 1, wherein the base portion is selectively removable from the vehicle.

7. The deployment assembly of claim 1, wherein the base portion comprises an additional securement feature to further secure the bipedal robot when the pair of laterally extendable members are in the retracted position.

8. The deployment assembly of claim 1, wherein the vehicle comprises an access door for the bipedal robot and the communication link is configured to send a signal to the vehicle to open and close the access door.

9. The deployment assembly of claim 1, wherein the communication link communicates with the vehicle for the purpose of opening or closing an access door on the vehicle.

10. The assembly of claim 1, wherein the pair of laterally extendable members are dimensioned in order to position the torso of the bipedal robot between the pair of laterally extendable members when the bipedal robot is engaged with the distal ends.

11. The assembly of claim 1, wherein the at least one securement feature is configured to release the bipedal robot when the bipedal robot's torso is raised above the position in which the bipedal robot's torso is secured by the securement feature when the bipedal robot is in the stowed location.

12. The assembly of claim 1, wherein the bipedal robot is in a folded configuration when in the stowed location, and wherein the folded configuration comprises the pair of foldable legs being folded behind the bipedal robot's torso.

13. A method for deploying a bipedal robot having a pair of foldable legs, a pair of arms and a torso, from a vehicle, the bipedal robot being secured in the vehicle by a deployment assembly having a base portion and one or more laterally extendable members, wherein the one or more laterally extendable members are laterally extendable in a direction parallel to a ground surface on which the vehicle is positioned, the method comprising:
   extending the one or more laterally extendable members from a retracted position within the vehicle, until they are in an extended position and the bipedal robot is positioned adjacent to the vehicle;
   sending a deploy signal to the bipedal robot;
   unfolding, by the bipedal robot, the pair of foldable legs from a folded configuration, wherein the pair of legs are folded behind the robot's torso;
   extending, by the bipedal robot, the pair of foldable legs until they make contact with the ground surface;
   pushing, with the pair of foldable legs, against the ground surface to cause the torso to rise and disengage from a securement feature disposed on the one or more laterally extending members, wherein the securement feature is configured to engage with a complementary feature on the bipedal robot's torso; and
   retracting the one or more laterally extendable members to the retracted position within the vehicle, whereby the bipedal robot is deployed from the vehicle.

14. The method of claim 13, further comprising communicating, by the bipedal robot, with the vehicle to open an access door to deploy the bipedal robot and to close the access door after the robot has deployed and the one or more laterally extendable members have fully retracted.

15. The method of claim 13, further comprising:
   communicating with the vehicle to open the access door;
   extending the one or more laterally extendable members so that the bipedal robot can re-engage with the one or more laterally extendable members;
   retracting the one or more laterally extendable members; and
   communicating with the vehicle to close the access door.

16. The method of claim 13, wherein the bipedal robot is secured in the vehicle with an actuated latching mechanism wherein latching occurs upon one or more of a signal from a sensor and a communication from the bipedal robot.

17. A deployment assembly for a releasably secured foldable bipedal robot, having a pair of legs, a pair of arms and a torso, comprising:
   a base portion mounted within a vehicle, wherein the base portion comprises a horizontal member coupled to the vehicle, and a vertical member;
   one or more extendable members coupled to the vertical member of the base portion for receiving the foldable bipedal robot, the one or more extendable members movable between a retracted position, where the foldable bipedal robot is in a stowed location within the vehicle, and wherein the vertical member is configured to a height to allow the bipedal robot to be in the stowed location in a folded configuration, and an extended position, when the foldable bipedal robot is in a deployable location, adjacent to the vehicle;

one or more of a sensor and a communication link disposed on the assembly for communicating with one or more of the foldable bipedal robot and the vehicle; and at least one securement feature disposed on the one or more extendable members for releasably securing the foldable bipedal robot, wherein the at least one securement feature is configured to releasably secure the foldable bipedal robot in the folded configuration wherein the foldable bipedal robot's legs are folded behind the robot's torso when the foldable bipedal robot is in the stowed location.

18. The deployment assembly of claim 17, wherein the at least one securement feature is further configured to release the foldable bipedal robot when the torso is raised vertically, whereby the foldable bipedal robot disengages from the deployment assembly when in the deployable location.

19. The deployment assembly of claim 17, wherein the securement feature is a mechanical securement feature.

* * * * *